United States Patent [19]
de la Cierva, Sr. et al.

[11] Patent Number: 4,577,229
[45] Date of Patent: Mar. 18, 1986

[54] SPECIAL EFFECTS VIDEO SWITCHING DEVICE

[76] Inventors: Juan de la Cierva, Sr.; Juan de la Cierva, Jr., both of 1450 NW. 78th Ave., Miami, Fla. 33126

[21] Appl. No.: 540,163

[22] Filed: Oct. 7, 1983

[51] Int. Cl.⁴ .................. H04N 5/04; H04N 5/262
[52] U.S. Cl. ..................... 358/182; 358/22; 358/181; 358/183
[58] Field of Search ............ 358/21 R, 22, 149, 160, 358/181, 182, 183, 185

[56] References Cited

U.S. PATENT DOCUMENTS 4,355,332 10/1982 Beeson ........................ 358/182
4,393,394 7/1983 McCoy ........................ 358/22

OTHER PUBLICATIONS

Videotape-The Adwar Hip Switcher, by Curt Roseman, Filmmakers Newsletter, Jul. 1977, pp. 50–52.
Video Effects Generator, Part 1, by E. A. Parr, Television, vol. 26, No. 6, Apr. 1976, pp. 294–297.
Video Effects Generator, Part 2, by E. A. Parr, Television, vol. 26, No. 7, May 1976, pp. 358–362.

*Primary Examiner*—Tommy P. Chin
*Attorney, Agent, or Firm*—Jesus Sanchelima

[57] ABSTRACT

A device for mixing video and audio signals originated from at least one remote camera and one director camera including a main unit having a circuit for synchronizing the video signals of the remote and director cameras, and a circuit for combining these signals through the use of removable special effects cartridges or subassemblies that are pre-programmed for predetermined video switching patterns. The circuit for synchronizing the video signals separates the sync signals from the director and remote cameras, locks the vertical, horizontal and color subcarrier on the director camera from the remote camera. The device is connected through junction box to director camera and video tape recorder, and directly to remote camera.

4 Claims, 11 Drawing Figures

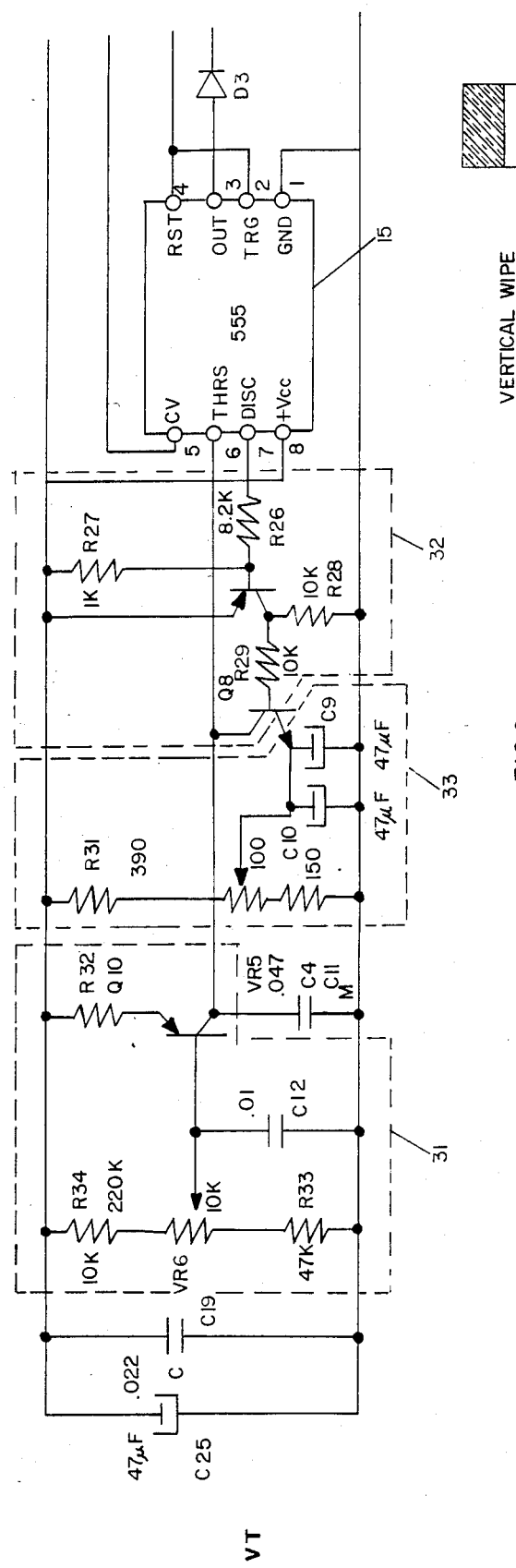
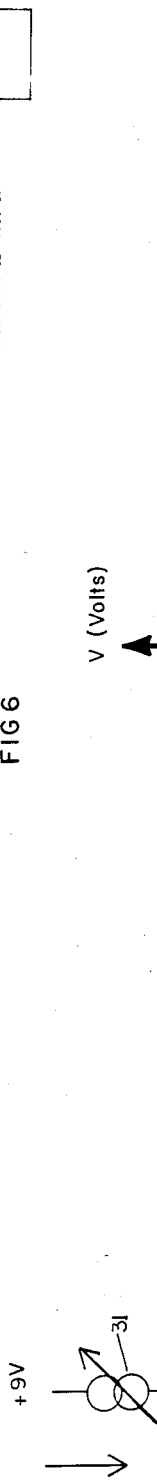
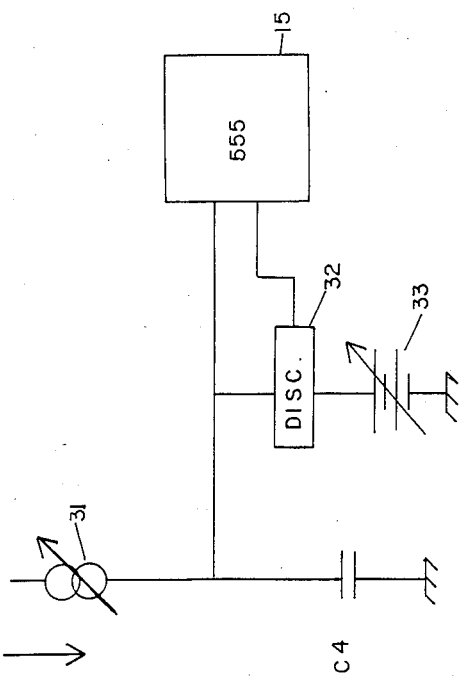
FIG 6
FIG 6A
FIG 6B

SPECIAL EFFECTS VIDEO SWITCHING DEVICE

BACKGROUND OF THE INVENTION

1. Field of the Invention

The present invention relates to video and audio devices capable of manipulating, modifying and monitoring video signals generated by interfaced video and audio sources.

2. Description of the Prior Art

The manipulation of video and audio signals in T.V. studios have been in constant evolution over the years. The professional and semi-professional users of the video special effects need non-complex, easy to operate and accurate means of introducing and superimposing video signals from different sources. The impracticality of carrying heavy equipment with the required special effects capability to remote areas where impromptus recording is taking place, coupled with the usual inability of electrically feeding this equipment, has created a need for a simple device that may be easily operated and inexpensive to manufacture.

No other device in the market at the present time has the features herebelow claimed and disclosed.

SUMMARY OF THE INVENTION

It is the main object of the invention to provide a device for simultaneous video and audio recording from two, or more, color cameras on one, or more video tape recorders (VTR), including special effects.

It is another object to allow the user, through a director camera, to monitor the video being taken by the remote camera(s).

It is another object of the invention to allow the preview of special effects from the remote camera(s).

It is another object of this invention to facilitate the achievement of precise recording control.

It is another object to dissolve the audio and video signals from two or more cameras unlimited number of pre-programmed special effect variations.

It is still another object of the invention to minimize the video interference normally associated with control switching.

It is yet another object of the invention to provide an automatic circuitry that will read subcarrier and sync signals from the remote camera and then locks the local camera into matching phase and timing.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details f construction and combination of parts as will be more fully understood from the following description, when read in conjunction with the accompanying drawings in which:

FIG. 6 is a schematic diagram of one of the removable plug-in modules having the vertical wipe special effect circuitry.

FIG. 6A is a block diagram representation of the schematic of FIG. 6.

FIG. 6B is a representation of the linear transfer function for timer 555 in the removable module.

DETAILED DESCRIPTION OF THE PREFERRED EMBODIMENT

Figure 1:
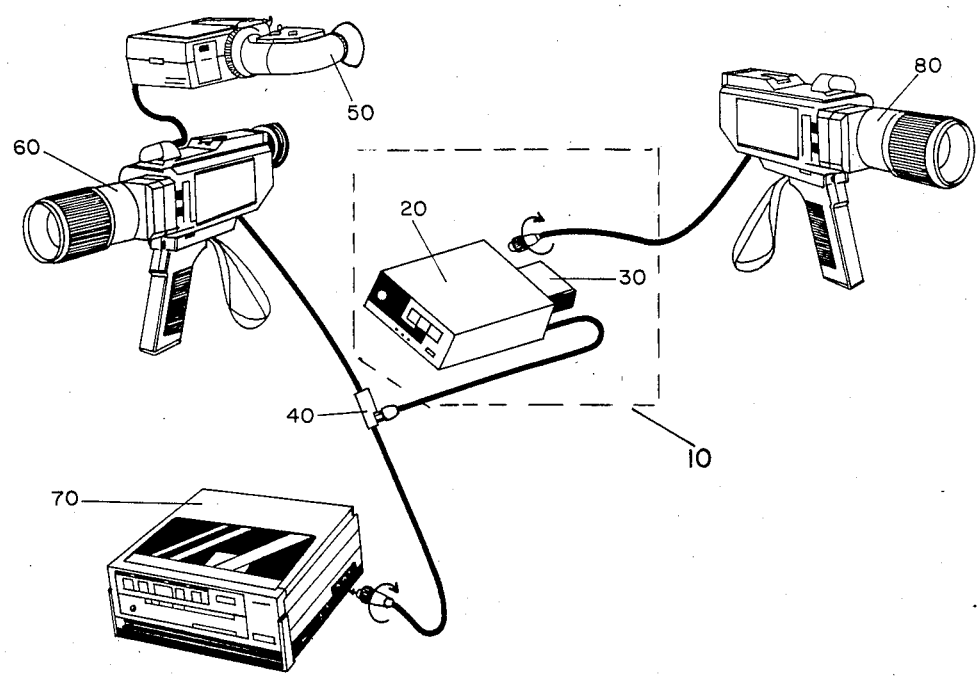
FIG. 1 is a representation of the system configuration.

Referring now to FIG. 1, wherein the present invention is referred generally by numeral 10, and it includes main unit 20 having removable module 30, junction box 40 and auxiliary viewfinder 50. The invention is connected through junction box 40 to director camera 60 and video tape recorder (VTR) 70 and it is also connected directly to remote camera 80. Basically, the user or users will be able to accurately monitor the video and audio signals, hereinafter referred to as signals, from cameras 60 and 80 and manipulate these signals to produce the desired special effects. Crucial to obtain these results is achieving genlock mode which corresponds to vertical, horizontal and color subcarrier phase lock.

Figure 2:
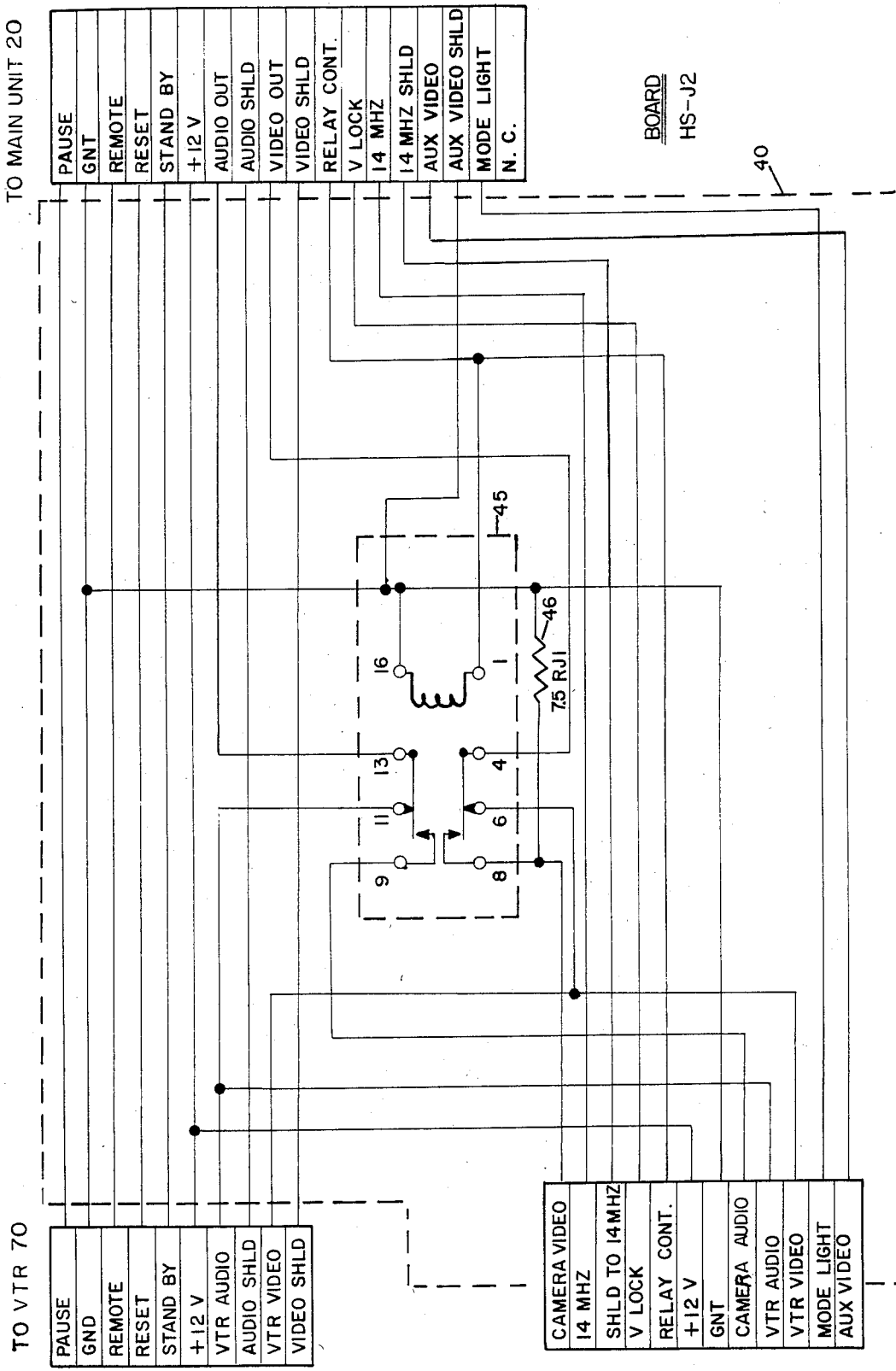
FIG. 2 is a diagram of the junction box 40 of FIG. 1.

Starting with junction box 40, refer to FIGS. 1 and 2, it can be observed that it has relay 45 (double pole, double throw) and resistor 46. Box 40 has three sets of input and/or output ports: one that is connected through a multiple wire cable to VTR 70, another set of ports connected to director camera 60 and the third one connected to main unit 20. The function of box 40, when relay 45 is activated at main unit 20, is to interrupt the connections between director camera 60 and VTR 70 and detour these connections to main unit 20, for processing and manipulation, before going back to VTR 70 through junction box 40. The processing and manipulation may or may not include the signal from remote camera 80.

Figure 3:
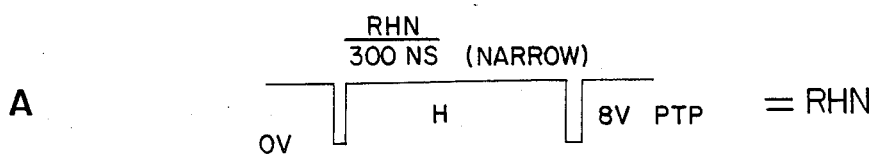
FIG. 3 is a timing chart of the main signals.
Figure 3:
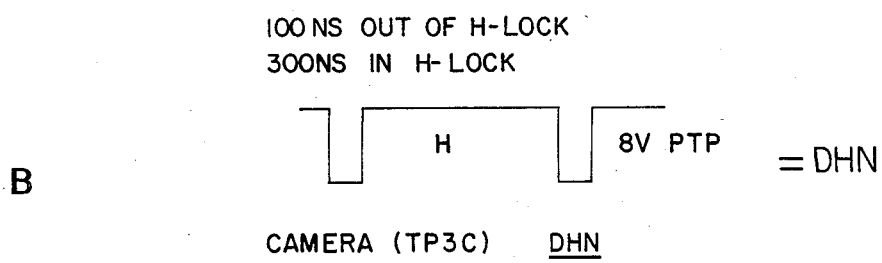
Figure 3:
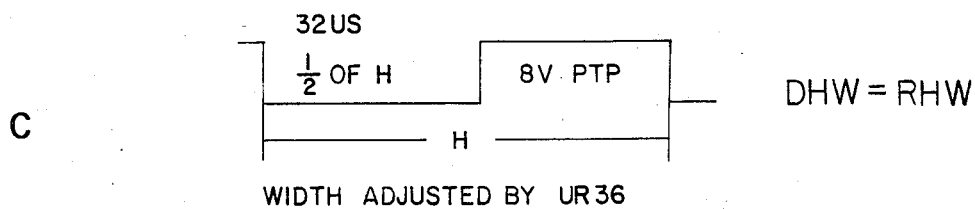
Figure 3:
Figure 3:
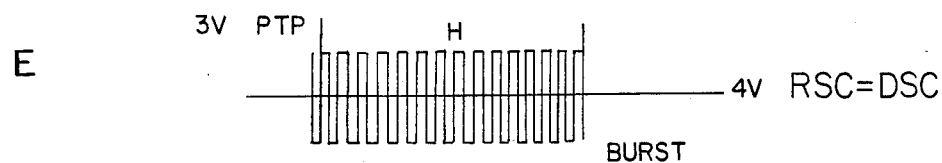
Figure 4:
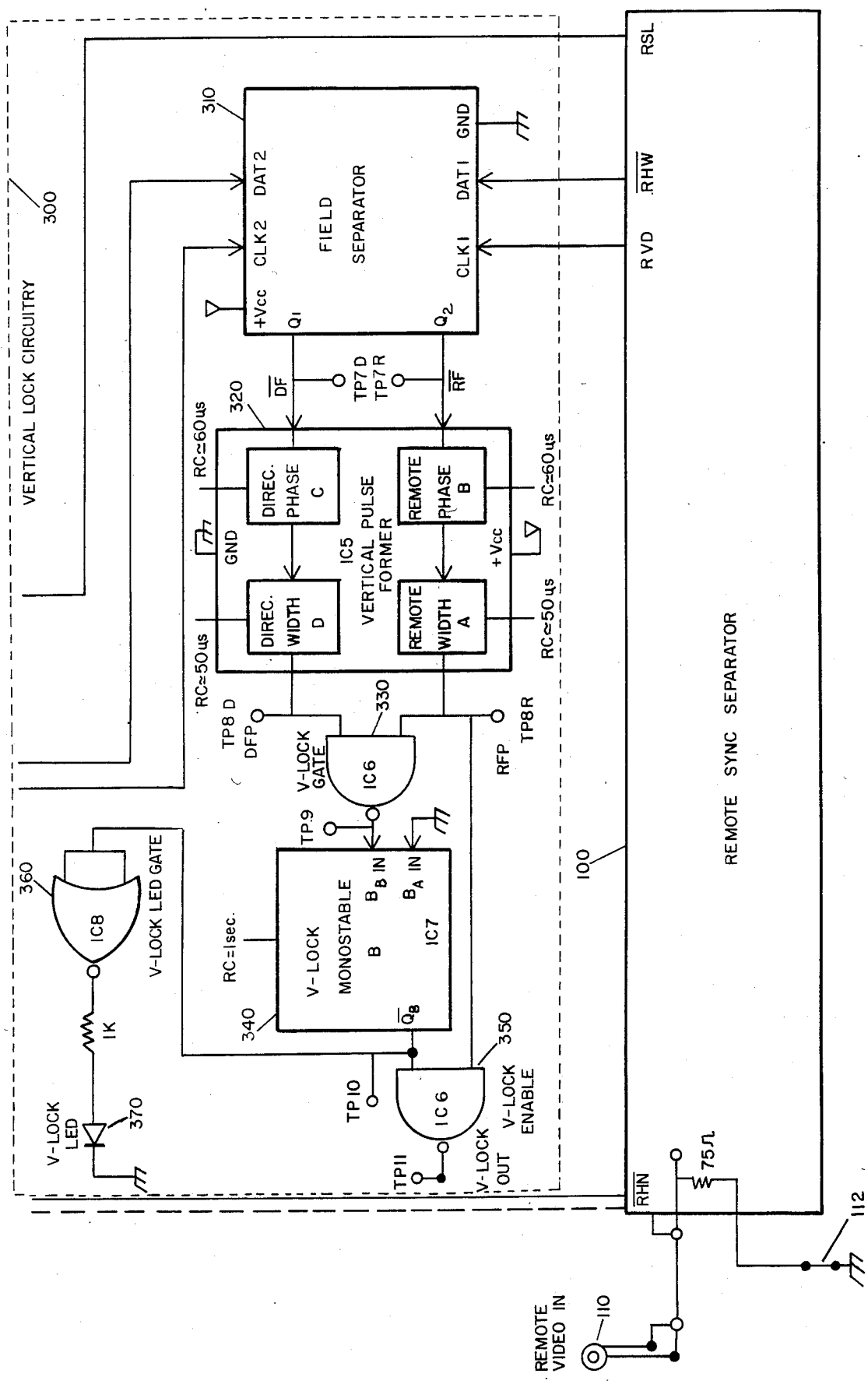
FIGS. 4 and 4A are block diagrams of the genlock circuit.
Figure 4A:
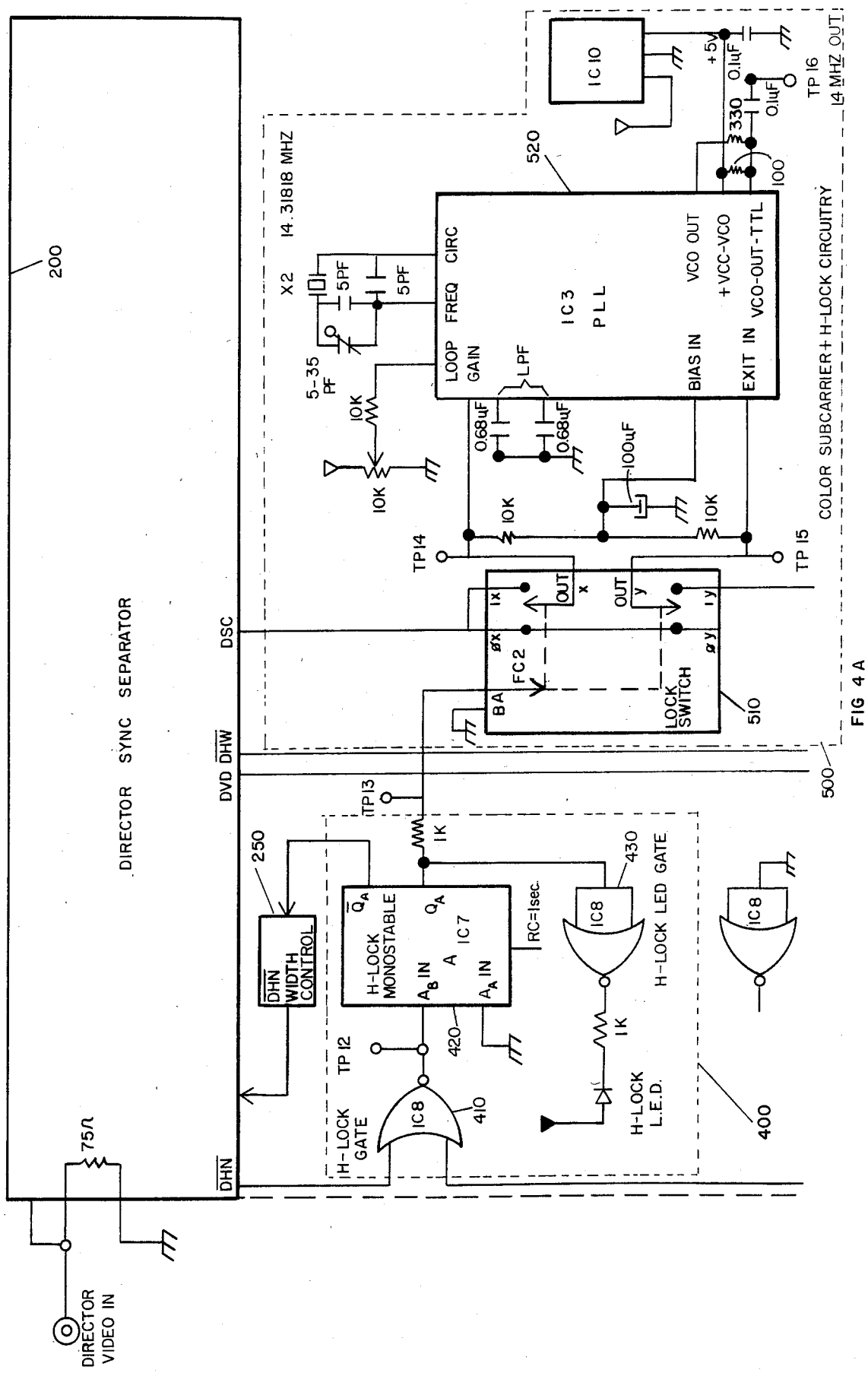

Main unit 20 is represented, in block diagram form, in FIGS. 4, 4A and 5, 5A, which correspond to the genlock circuitry and switching circuitry, respectively. The genlock circuitry is an improved version of the genlock circuit described and claimed in a previous patent application, U.S. Pat. No. 4,450,480. The main purpose of the genlock circuit, FIG. 4, is to synchronize the horizontal, vertical and color sub-carrier sync signals of the director and remote cameras 60 and 80. Refer to FIG. 3. In the preferred embodiment, remote camera 80 drives director camera 60. Genlock circuitry, FIG. 4, comprises in general block terms, five sub-circuitries, namely, (a) remote sync separator; (b) director sync separator; (c) vertical lock circuitry; (d) horizontal lock detector and (e) color subcarrier and horizontal lock circuitry.

The standard video signal from remote camera 80 is connected to remote sync separator 100, as shown in FIG. 4, through input socket 110 seeing an input impedance of either 75 ohms if switch 112 is closed or greater than 5000 ohms if open. Remote sync separator 100 extracts four sync signals, i.e., RVD (remote vertical drive), $\overline{\text{RHW}}$ (inverted remote horizontal wide), $\overline{\text{RHN}}$ (inverted remote horizontal narrow) and RSC (remote subcarrier). See timing chart in FIG. 3. The circuitry used for sync separator 100 is known in the art. Basically, the circuitry should be designed to extract the signals shown in FIG. 3.

Director sync separator sub-circuitry 200 is similar to remote sync separator sub-circuitry 100, with the exception of the input impedance which is always 75 ohms and the added circuit for width control for the director horizontal narrow ($\overline{DHN}$) signal which is represented by block 250 within director sync separator 200.

Vertical lock subcircuitry 300 includes field separator 310, vertical pulse former 320, vertical lock gate 330, vertical lock monostable multivibrator 340, vertical lock enable gate 350, vertical lock LED gate 360 and LED 370. Field separator 310 is implemented, in the preferred embodiment, with 4013 Dual-D Flip Flop integrated circuit.

One of the D Flip Flops receives its Date input from the inverted remote horizontal wide ($\overline{RHW}$) output of remote sync separator 100 and its Clock input from the reote vertical drive (RVD) output of separator 100. Similarly, the other D Flip Flop receives its Data input from the inverted director horizontal wide ($\overline{DHW}$) output of director sync separator 200 and its Clock input from director vertical drive (DVD) output from separator 200. Outputs Q1 and Q2 provide inverted director field ($\overline{DF}$) and remote field ($\overline{RF}$) signals to the inputs of vertical pulse former 320, which is implemented with a 558 quad-timer integrated circuit. Former 320 producers inverted director field pulse (DFP) and inverted remote field pulse (RFP) signals.

DF and RF signals denote the odd and even fields, and obviously, the beginning and end of each field. The resulting DFP and RFP come from the processed $\overline{DF}$ and $\overline{RF}$ signals after being delayed 60 micro-seconds (slightly less than one line) and being formed as shown in FIG. 3D. When DFP and RFP are in phase (in genlock), then the output of vertical lock gate 330 produces pulse P., which is the inverse of the signal shown in FIG. 3D, at the input of multivibrator 340. If genlock condition is not present, signal P is high. The inverted output (QB) of multivibrator 340 is high when P is high which is when DFP and RFP are not in phase and, consequently, there is no genlock and LED 370 is off. Multivibrator 340 is implemented with one half of a dual retriggerable monostable multrivibrator integrated circuit such as a 4528. When DFP and RFP are in phase (genlock mode), QB goes low with the falling edge of P, and consequently, LED 370 turns on. More important, when QB is low (genlock mode), the output (vertical lock out) of gate 350 is high which disables the slip gate inside the director camera 60, and thereby establishes vertical lock without losing any more lines. Refer to FIG. 6.

The horizontal lock detector sub-circuitry 400 includes horizontal lock gate 410, monostable multivibrator 420 and LED gate 430. The RHN signal from remote sync separator 100 is fed to one input of gate 410 and, similarly, the other input of gate 410 is connected to the $\overline{DHN}$ output of separator 200. RHN is always 300 nanoseconds wide while $\overline{DHN}$ is 300 nanoseconds only in genlock mode, otherwise, it is 100 nanoseconds wide. Output QA of multivibrator 420 is connected to the width control circuit of sync separator 200 causing the pulse width of $\overline{DHN}$ to change from 100 to 300 nanoseconds when horizontal lock is established.

Color subcarrier and horizontal lock sub-circuitry 500 includes lock switch 510 and phase lock loop integrated circuit 520 with suitable supply voltage sources. The outputs RSC (remote sub-carrier) and DSC (director sub-carrier) are connected to lock switch 510, which is implemented with a quad-pull double throw switch 510 is used as a double pole, double throw switch with the poles in tandem. The poles, pins 13 and 3 are conncted to the inputs of phase lock loop integrated circuit 520 which is implemented with a 564 integrated circuit. Three of the four switch terminations of lock switch 510 are connected to DSC output of separator 200. The other switch termination is connected to the RSC output of separator 100.

Figure 1A:
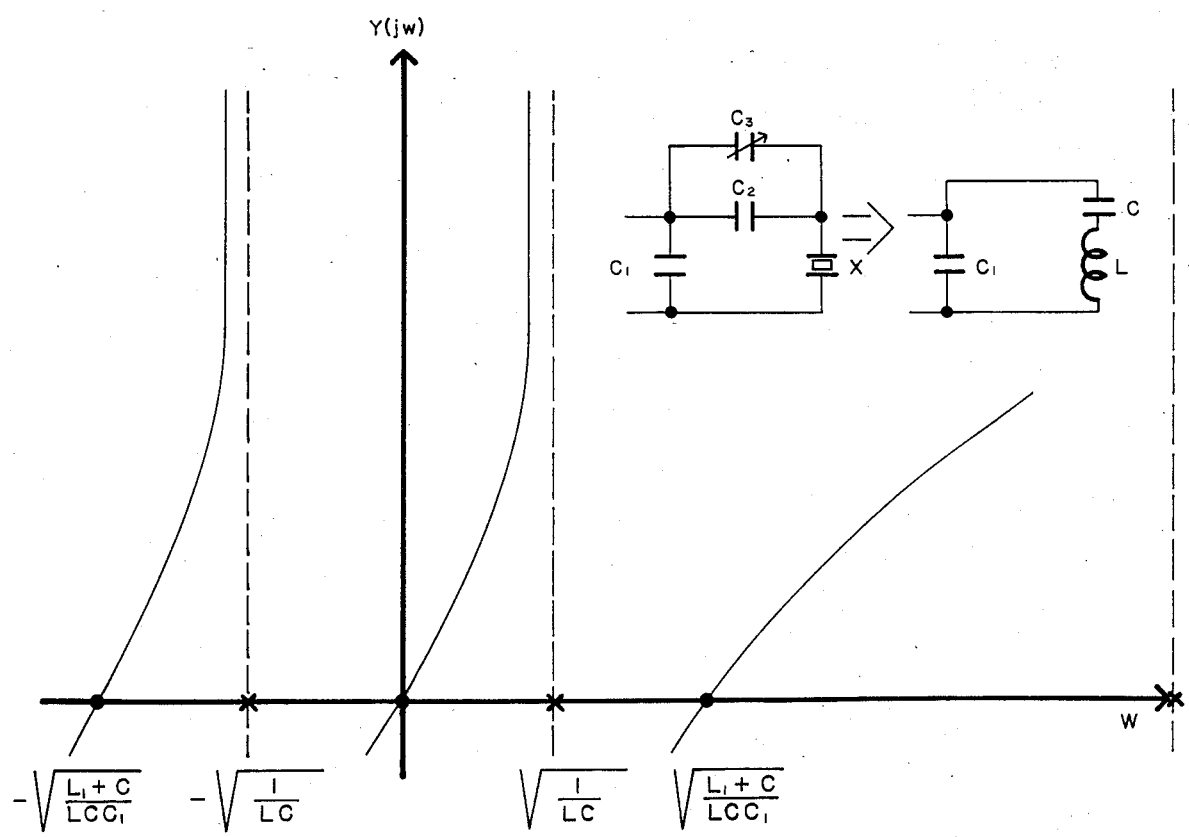
FIG. 1A is a pole-zero diagram of the filter of phase lock loop circuitry 520.

The control input of lock switch 510 is connected to the output QA of horizontal lock monostable multivibrator 420. When not in horizontal lock output QA is low thereby both poles of switch 510 are connected to DSC. When in horizontal lock, one of the poles is connected to the DSC and the other one is connected to RSC. Therefore, when in horizontal lock, the phase lock loop IC 520 insures correct phase lock for the color subcarrier and for the horizontal sync of director camera 60 to remote camera 80. The output of IC 520 is a 14.31818 Megahertz signal that is used to replace the internal oscillator signal of director camera 60. It is very important to note that the RC for the VCO free-running frequency recommendation of the manufacturer of the 564 integrated circuit does not work in this circuit application which requires a special pole zero diagram, see FIG. 1A, of the RC time constant circuit having admittance characteristics as described below:

$$Y(jw) = jw\,(C_1 + C/(1-W^2LC))$$

Where L is the inductance of crystal X and C is the series capacitance equivalent of: (a) the sum of $C_2$ plus $C_3$ and (b) $C_x$ which is the capacitance of the crystal.

$$C_A = C_2 + C_3$$

$$C = \frac{C_A\,C_X}{C_A + C_X}$$

In the preferred embodiment, the time constant free running frequency circuit used is the one represented in FIG. 4, between pins 12 and 13 of phase lock loop IC 520.

Figure 5:
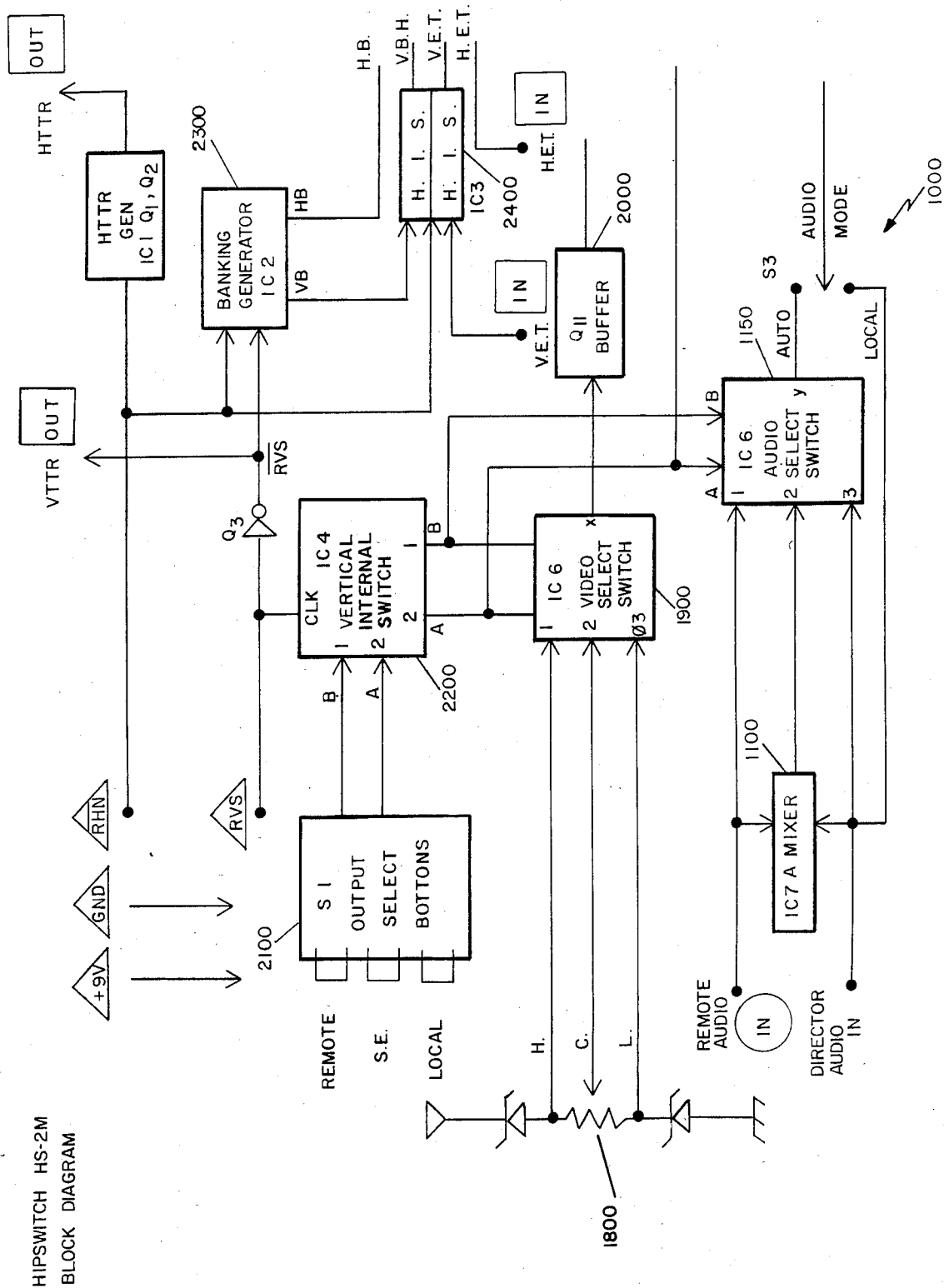
FIGS. 5 and 5A are block diagrams of the switcher circuit.
Figure 5A:
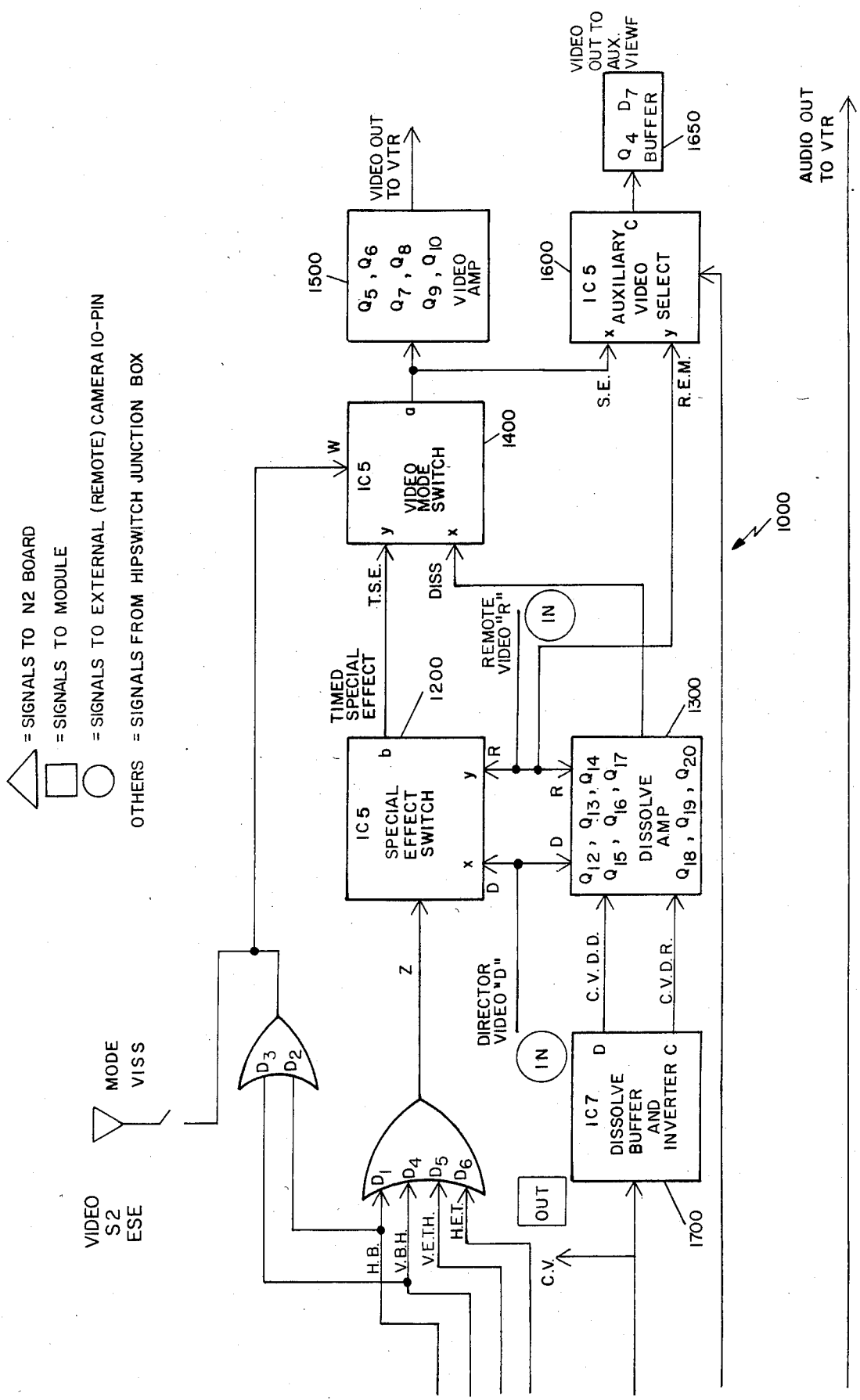

As shown in FIG. 5, the switching circuit is generally referred to by numeral 1000 and it basically has two sub-circuits, namely, the audio and the video which are only interconnected through control signals A and B on IC6. The function of the audio sub-circuit is to conventionally mix and/or select the audio signals from the director and remote cameras 60 and 80. The audio sub-circuit is implemented through the use of operational amplifier A of IC7, which functions as a mixer, referred to with numeral 1100 and analog switch "Y" 1150 in IC6, thereby providing the audio output to VTR 70.

The inputs to the video sub-circuit are represented by inputs "D" and "R" which both are connected to special effect switch 1200 and to dissolve amplifier network 1300. The video outputs from switch 1200 and network 1300 are then fed to video mode switch 1400 which in turn drives the video output amplifier 1500 which finally sends the signal to VTR 70.

Special effect switch 1200 is implemented with one section (B) of IC 5 which has 3 independent single pole double throw analog switches, i.e., 4053. The switching is controlled by input "Z" which is tailored to the special effect pattern desired and the generation of the control signal "Z" will be described below. The output of switch 1200 is then fed to another section (A) of IC5, in particular, video mode switch 1400.

Dissolve amplifier network 1300 is a conventional video mixer with the director and remote video signals as inputs and signals CVDD (Control Voltage Dissolve Director) and CVDR (Control Voltage Dissolve Remote), as control signals. The output is fed to video mode switch 1400 similarly to the output of the timed special effect switch 1200. Only one of the two outputs will be selected by video mode switch 1400 to be passed through to video amplifier 1500, as controlled by control "W".

Auxiliary video select switch 1600 is used to route either the remote video signal or the special effect (S.E.) signal to auxiliary viewfinder 50 on director camera 60, through buffer 1650.

The control signals may be classified as control signals for dissolve amplifier 1300 and control signals for special effects switch 1200. The result of the interaction of these control signals is to produce control signals "Z", "CVDD" and "CVDR", which will determine how the two (director and/or remote) signals are ultimately fed to VTR 70.

Signal "CVDD" is the inverse of "CVDR". Signal "CVDD" is the same as signal "CV" at the input of dissolve buffer and inverter 1700 which is implemented with two sections (C and D) of IC7 which is a quad operational amplifier, i.e., LM-324. The "CV" signal is originated at effect control circuitry 1800, in FIG. 5, which sends three signals H (high), C (center) and L (low) to video select switch 1900 so that only one of these will be processed through buffer 2000 depending on the state of inputs A and B to video select switch 1900 which is implemented with IC6 which a double pole quadruple throw switch, i.e., 4052. Going back through inputs A and B, it can be observed in FIG. 5 that these control signals are coded signals identifying which video is selected by the user on output select buttons 2100. To avoid interruption of a frame when a user activates switch 2100, the vertical interval switch circuitry 2200 is provided so that the new mode selected by the user is gated through to switch 1900 only when a remote vertical sync pulse (RVS) is present.

Control signal "Z" for special effects switch 1200 will cause remote signal "R" to be switched through to video out to VTR if "Z" is high. "Z" is high if any one of the following four conditions occur:

1. Horizontal blanking (HB) is high. HB is generated by blanking generator 2300 which is quad timer IC, i.e., 558. HB is generated when "$\overline{RHN}$" indicates the presence of a horizontal sync pulse. The purpose of generating a "Z" signal when a horizontal sync pulse is present is to force the video out to be connected to remote video, and this is necessary to maintain a constant synchronization reference signal.

2. Vertical blanking horizontal (VBH) is high when a vertical blank (VB) is generated by blanking generator 2300 and enabled through horizontal interval switch 2400 when "$\overline{RHN}$" is present.

3. Vertical external timing horizontal (VETH) is high when the vertical external timing (VET) signal from the removable module 30, to be explained below, is high and gated through horizontal interval switch 2400 by "$\overline{RHN}$".

4. Horizontal external timing (HET) is high which is received from module 30.

The last two conditions involve signals VET and HET coming from removable module 30 which are generated by processing module input signals: control voltage (CV), horizontal timing trigger and reset (HTTR) and remote vertical sync (RVS). A typical module circuitry is shown in FIG. 6 and its simulated model equivalent in FIG. 6A. Basically, through a novel use of timer 555, referred by numeral 15, the particular control switching signals for the special effects are generated.

Specifically, an adjustable conventional current generator 31 is used to charge capacitor C4 and a discharge circuit 32, which modeled with an equivalent in FIG. 6A and enclosed with broken lines in FIG. 6 has replaced the conventional RC circuit recommended by the manufacturer of the 555 timer. The object being to convert voltage into time linearly, and also to define the straight line produced in a voltage/time cartesian.

The slope of the linear transfer function is determined by the current produced by adjustable constant current source 31 that linearly charges capacitor C4 and the minimum voltage at minimum time (3.5 volts at 2 microseconds in the preferred embodiment) provides the required point to define the aforementioned transfer function and is controlled by adjustable constant voltage source 33 as shown in FIGS. 6A and 6B. By changing the slope, in both, magnitude and sign, different effects may be obtained. The one shown in FIG. 6 corresponds to a vertical wipe pattern so that the top half of the video output will correspond to either the director or the remote video signal and the bottom half corresponds to the other.

If a horizontal wipe pattern is desired, then the reset and trigger inputs to the 555 timer are connected to EHS so that $t=o$ occurs with each horizontal sync pulse. How far to the right will be the cutting point from one video camera signal to the other will depend on the setting of the control voltage (CV).

One of the most impressive features of the present invention is the automatic genlock circuitry which reads subcarrier and sync signals from the remote camera and then locks the local camera into matching phase and timing. The genlock circuitry matches the local camera to the remote camera's subcarrier. Then, the genlock circuitry introduces controlled drift into the local camera's horizontal sync timing until the pulses from the two cameras are matched. After locking the horizontal sync, the genlock circuitry repeats the process with the vertical sync, introducing drift in the local camera, one line at a time, until vertical coincidence is achieved. This automatically handles one of the trickiest and most time-consuming aspects of setting up a multi-camera production, and also eliminates the need for a vectorscope or waveform monitor.

The present invention does not require all the complex interconnecting interface circuits usually necessary to interface industrial and broadcast gear.

It is believed the foregoing description conveys the best understandng of the objects and advantages of the present invention. Different embodiments may be of the inventive concept of this invention. It is to be understood that all matter disclosed herein is to be interpreted merely as illustrative, and not in a limiting sense, except as set forth in the following appended claims.

What is claimed is:

1. A device for mixing video and audio signals originated from at least one remote camera and one director camera, comprising, in operative combination:
    A. an internal means for synchronizing said video signals connected to said remote and director cameras; and B. Means for combining said video signals connected to said remote and director cameras including removable cartridges having special effects means that are programmed for predetermined video switching patterns, including means for dissolving said video signals and means for mixing said audio signals.

2. The device set forth in claim 1 wherein said means for synchronizing said video signals includes means for separating sync signals from said director and remote cameras, means for achieving vertical lock on the director camera from the remote camera and means for achieving color subcarrier and horizontal lock on the director camera from the remote camera by locking the director camera to the phase and timing of the remote camera after a controlled drift.

3. The device set forth in claim 2 wherein said means for achieving color subcarrier and horizontal lock includes a phase lock loop integrated circuit having an RC time constant circuitry defined by the following admittance formula:

$$Y(jw) = (C_1 + C/(1 - W^2LC))$$

so that the phase relationship between the subcarrier and horizontal signals of said remote and director cameras are maintained.

4. The device set forth in claim 1 wherein said removable special effects means includes a integrated circuit timer having its RC time constant connected to a capacitor and adjustable switched voltage source means biasing said capacitor and further having adjustable current source means for charging said capacitor.

* * * * *